(12) United States Patent
Stripe

(10) Patent No.: US 6,568,714 B2
(45) Date of Patent: May 27, 2003

(54) TUBE CONNECTOR

(75) Inventor: Stanley E. Stripe, Hilliard, OH (US)

(73) Assignee: Dayco Products, Inc., Miamisburg, OH (US)

( * ) Notice: Subject to any disclaimer, the term of this patent is extended or adjusted under 35 U.S.C. 154(b) by 0 days.

(21) Appl. No.: 10/051,354

(22) Filed: Jan. 18, 2002

(65) Prior Publication Data

US 2002/0096882 A1 Jul. 25, 2002

Related U.S. Application Data

(63) Continuation-in-part of application No. 09/575,947, filed on May 23, 2000, now abandoned.

(51) Int. Cl.$^7$ .............................................. F16L 33/24
(52) U.S. Cl. .................... 285/253; 285/334.5; 285/259; 285/239
(58) Field of Search ........................ 285/334.5, 260, 285/252, 253, 239, 240, 241, 257, 259, 222.1–222.5

(56) References Cited

U.S. PATENT DOCUMENTS

| | | | |
|---|---|---|---|
| ,140,374 A | | 7/1873 | Kennedy |
| 140,374 A | * | 7/1873 | Kennedy ................... 285/259 |
| ,654,735 A | | 7/1900 | Jordan |
| ,969,216 A | | 9/1910 | Stephens |
| 969,216 A | * | 9/1910 | Stephens ................... 285/239 |
| 1,062,155 A | | 5/1913 | Harris |
| 1,509,484 A | * | 9/1924 | Powell ...................... 285/239 |
| 1,794,955 A | | 1/1931 | Gordon |
| 1,994,784 A | * | 3/1935 | Porzel ....................... 285/259 |
| 2,032,297 A | * | 2/1936 | Mikulasek ................. 285/259 |
| 2,842,163 A | * | 7/1958 | Boylan ...................... 285/240 |
| 3,087,747 A | | 4/1963 | Novotny |
| 3,114,969 A | * | 12/1963 | Roth ......................... 285/239 |
| 3,598,428 A | | 8/1971 | Smith |
| 3,653,692 A | | 3/1972 | Henson |
| 3,759,553 A | * | 9/1973 | Carter ....................... 285/260 |
| 4,029,345 A | * | 6/1977 | Romanelli ............... 285/334.2 |
| 4,313,628 A | * | 2/1982 | Duenke ..................... 285/115 |
| 4,428,900 A | | 1/1984 | Riley et al. |
| 5,430,603 A | | 7/1995 | Albino et al. |
| 5,553,900 A | * | 9/1996 | Fukumoto et al. .......... 251/148 |

FOREIGN PATENT DOCUMENTS

| | | | |
|---|---|---|---|
| FR | 1359919 | 3/1964 | |
| WO | 82/03440 | * 10/1982 | ................. 285/260 |

* cited by examiner

*Primary Examiner*—Eric K. Nicholson
(74) *Attorney, Agent, or Firm*—Joseph V. Tassone

(57) ABSTRACT

A connector insert for coupling a hose to a tube and an assembly using the connector insert is described wherein the connector insert has a first end, a second end and a uniformly tubular body member along a longitudinal axis. The tubular body member further includes a es a flared member extending radially outward and in the direction of the first end to form an annular ridge and the flared member further tapers radially inward toward said first end forming a first annular rim adjacent the first end. The annular rim has a smaller circumference than the circumference of the annular ridge. The tapered portion enhances the ability of the hose to form a bead and also to prevent pull-off.

22 Claims, 2 Drawing Sheets

TUBE CONNECTOR

This is a continuation-in-part of application Ser. No. 09/575,947, filed May 23, 2000, now abandoned.

BACKGROUND OF THE INVENTION

This invention relates generally to coupling means for connecting plastic tubing to the open end of a hose.

Hose assemblies for transporting various fluids in vehicles, machinery, etc. are known. Often it is desirable or necessary to assemble, e.g., plastic tubing to another tube or hose. In order to provide a suitable connection between a particular plastic tubing and another tube or hose, it is necessary to use some sort of support device and a clamping device. Current coupling devices are not robust enough to adequately support clamping forces necessary to assemble the plastic tubing to another tube or hose, nor do such devices provide adequate pull-off forces as required by Original Equipment Manufactures (OEM). In general, plastic tubing does not have the ability to withstand high clamping forces nor does such plastic tubing provide the stiffness needed to maintain integrity of the connection. Accordingly, there is a need in the industry for a tube connector that overcomes the failings of the prior art.

SUMMARY OF THE INVENTION

The present invention relates to a support connector insert having robust characteristics which can be effectively used to form a joint between a tube such as a plastic tube and a hose, e.g., a rubber hose. More specifically, the connector insert of the present invention has a robust tubular shape wherein at least one end of the connector has a flared flange wherein the circumferential rim of the flared flange further tapers inwardly to provide an enhanced surface area and configuration which allow the connector insert to seat in the tube member to form a bead which prevents leaking as well as providing improved pull-off forces.

In one embodiment, the connector insert of the present invention is configured to permit the connector insert to be implanted in the tube prior to the coupling of the hose to the tube. The connector insert comprising a tubular member having a first end, a second end and a uniformly tubular body member along a longitudinal axis wherein the tubular body member is intermediate the first end and the second end. The tubular body member further comprises a flared member extending radially outward and in the direction of the first end to form an annular ridge, the annular ridge further tapering radially inward toward the first end forming a first annular rim adjacent the first end. Typically the first annular rim has a smaller circumference than the circumference of the annular ridge, the configuration of the insert being such that, upon being implanted into one end of the tube, the tube forms a bead around the first annular rim to secure the connector insert therein and the tubular body member extends in a direction toward the second end to form a second annular rim adjacent the second end. The circumference of the tubular body member is essentially equal to the circumference of said second annular rim.

In another embodiment, an assembly of the present invention comprises a hose having a uniform inner diameter extending a predetermined distance from at least one end of the hose; a tube having an outer diameter equal to or less than the inner diameter of the hose, the outer diameter extending a predetermined distance from one end of the tube; and a connector insert implanted into one end of the tube for coupling the tube to the hose.

DETAILED DESCRIPTION OF THE INVENTION

Figure 1:
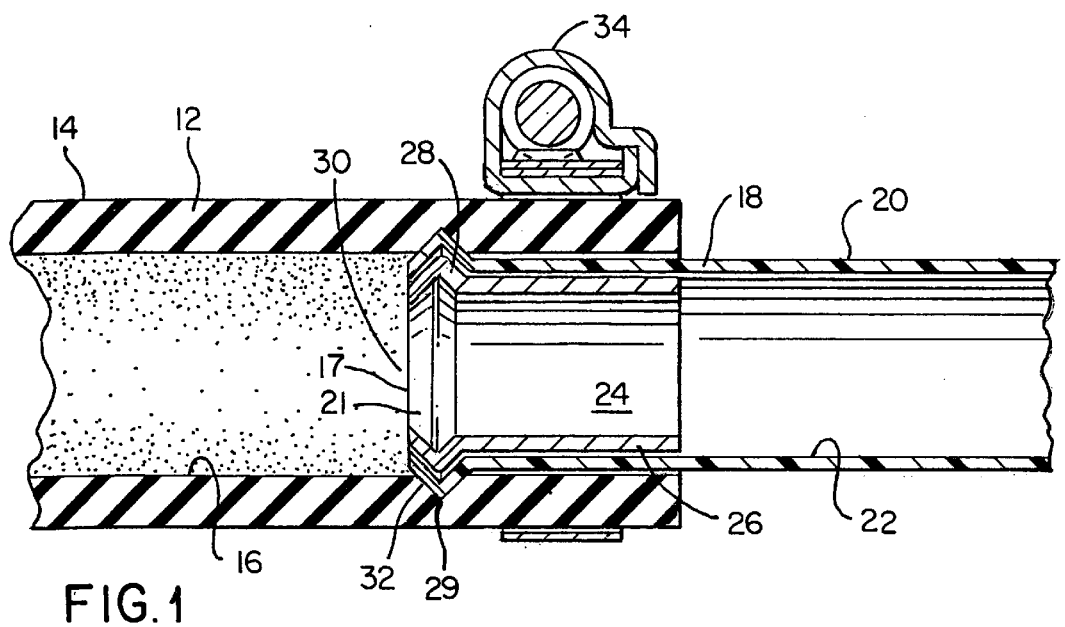
FIG. 1 is a side view of a hose coupled to a tube using the connector insert of the present invention shown in cross-section with clamping means not applied to the hose.

In accordance with the present invention, a hose assembly 10 is shown in FIG. 1. The hose assembly 10 includes a hose 12, preferably a rubber hose having an outer surface 14 and an inner surface 16. The hose assembly 10 also includes a tube 18 having an outer surface 20 and an inner surface 22. The outer surface 20 of the tube 18 has a circumference which is substantially equal to or slightly smaller than the circumference of the inner surface 16 of hose 12 so that an end 17 of the tube 18 can be inserted a desired predetermined distance into an open end 19 of hose 12.

Figure 2:
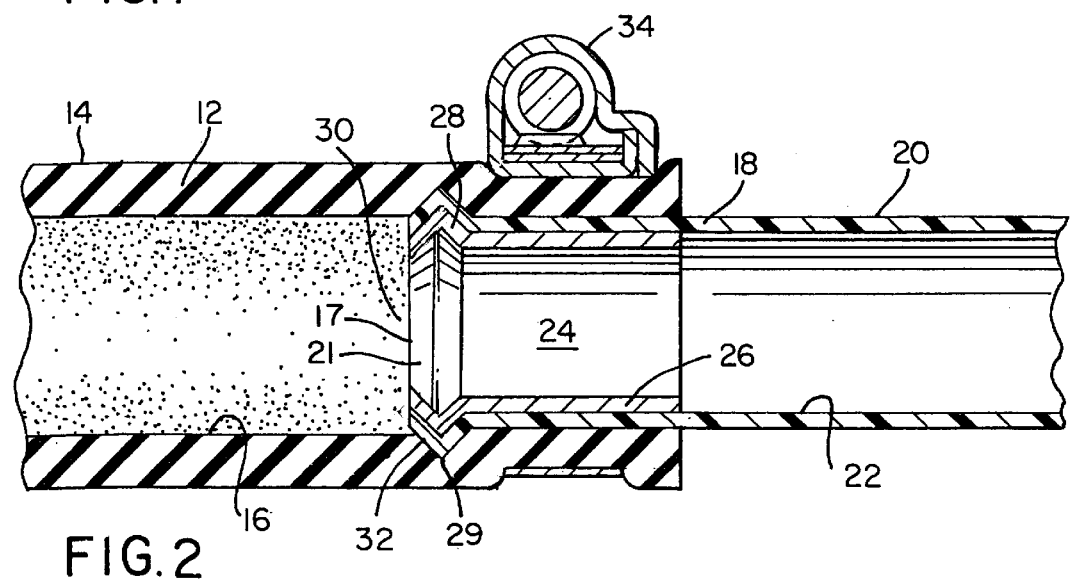
FIG. 2 is a cross-sectional side view of the assembly of FIG. 1 with the clamping means applied.
Figure 3:
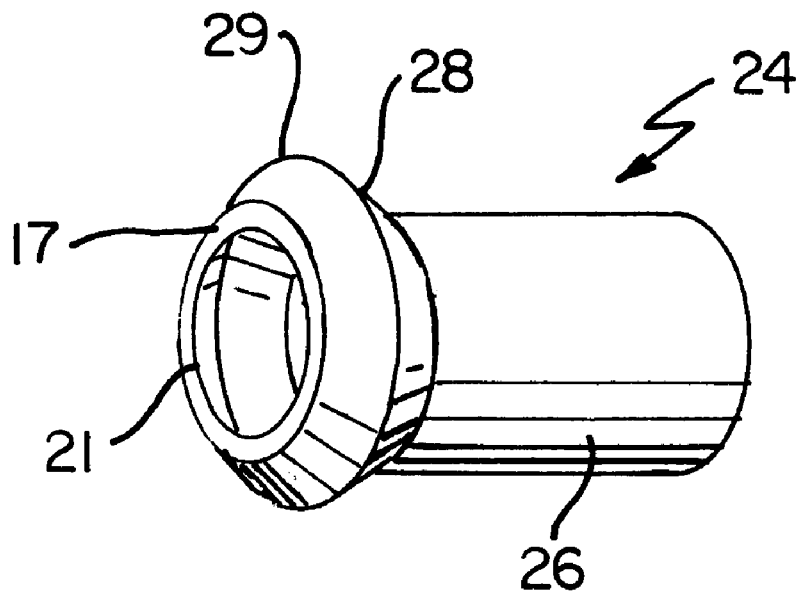
FIG. 3 is a perspective view of a connector insert of the present invention.
Figure 4:
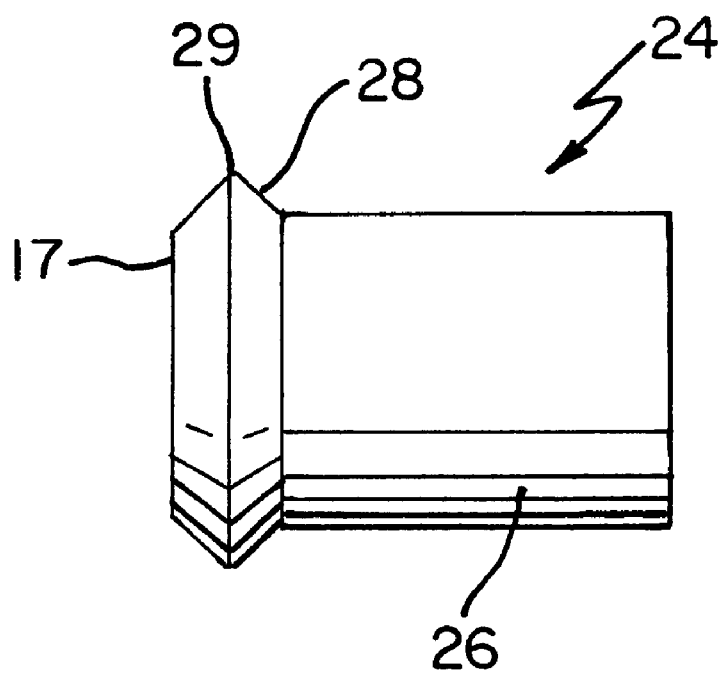
FIG. 4 is a side view of the connector insert of FIG. 3.

As shown in FIGS. 1 and 2, the connector insert 24 having an elongated tubular body 26 exhibits a flared portion 28 at one end of the tubular body 26 forming a circumferential rim 29. The circumferential rim 29 further tapers forwardly and downwardly toward the end 17 of the insert 24 to form a circumferential opening 21 defining the end 17 of the insert 24. This end 17 which is approximately of the same circumference of the tubular body 26, as best shown in FIGS. 3 and 4, is inserted into an end of the tube 18 through opening 30, such that the connector insert 24 is disposed entirely inside the tube 18 with the tapered end of the connector insert 24 being adjacent to opening 30 of tube 18 where the tube forms a bead 32 around the circumferential opening 21 of the connector insert 24. The flared end 28, which is flared to provide a 360° circumferential flange seats in the bead 32, thus more or less permanently securing the connector insert 24 in the tube 18. The connector insert 24 provides necessary support to allow tube 18 to be coupled to hose 12 using clamping means 34 such as a worm screw clamp, spring clamp, and the like. The flanged end 28 of the connector insert 24 also cooperates with bead 32 to enhance pull-off performance.

The hose useful in the present invention is constructed of any of the materials useful in the manufacture of hoses employed in transporting fluids, vapors and gases typically used in the transportation and heavy equipment industries, e.g., automobiles, trucks, buses, trains, planes, ships, earth movers, etc. Depending on the specific use of the assembly, the hose can be constructed of any polymeric material generally used for the intended use. Such materials include natural and synthetic rubbers. Examples of the synthetic rubber used herein include homopolymers of conjugated dienes such as isoprene, butadiene, and chloroprene, for example, polyisoprene rubber, polybutadiene rubber, and polychoroprene rubber; copolymers of the conjugated dienes with vinyl compounds such as styrene acrylonitrile, vinylpyridine, acrylic acid, methacrylic acid, alkyl acrylates, and alkyl methacrylates, styrene-butadiene copolymer rubber, vinyl-pyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of olefins such as ethylene, propylene end isobutylene with diene compounds, for example, isobutylene-isoprene copolymer rubber; copolymers of olefins with nonconjugated dienes (EPDM), for example, ethylene-propylene-cyclopentadiene terpolymers, ethylene-propylene-5-ethylidene-2-norbornene terpolymers, and ethylene-propylene-1,4-hexadiene terpolymers; polyalkenamers obtained by ring opening polymerization of cycloolefins, for example, polypentenamer; rubbers obtained by ring opening polymerization of oxysilane rings, for example, sulfurvulcanizable polyepichlorohydrin rubber; and polyproplene oxide rubber. Halogenated products of the foregoing rubbers are also employable, for example, chlorinated isobutylene-isoprene copolymer rubber and brominated isobutylene-isoprene copolymer rubber. Also included are homopolymers, copolymers and terpolymers of hexafluoropropylene, tetrafluoroethylene, and vinylidene fluoride, and blends thereof. Ring opened polymers of norbornene may be used. Further useful are rubber blends, for example, blends of the foregoing rubbers with saturated elastomers such as epichlorohydrin rubber, hydrogenated, nitrile rubber, polypropylene oxide rubber, and chlorosulfonated polyethylene. The thickness of the hose which may include one or more layers is consistent with those hoses commonly used in similar applications.

The tube used in the present assembly is a molded or extruded polymeric material which can withstand high temperatures and pressures, is not affected by solvent characteristics associated with the fluid being transported through the tube and which has sufficient initial elasticity to deform slightly in order to accommodate the insertion of the connector insert. The thickness of the tube which may contain one or more layers should be sufficient to provide the required strength and pull-off characteristics while not being so thick as to reduce the effects of the connector insert. Typically, the tube material is selected depending on the intended application of the assembly. Preferably, the tube is a synthetic resin. Examples of the useful resin include polyolefins such as polyethylene, polypropylene, polybutene-1; polyesters such as polyallylate, polyethylene terephthalate, polybutylene terephthalate, polyoxybenzolyl, etc.; polyamides such as nylons, e.g., nylon 6, nylon 66, nylon 11, nylon 12, nylon 4, nylon 6/66, nylon 6/10, nylon 6/12, etc.; aromatic polyamides; polyethers such as polyacetal, polyphenylene oxide, polyether ether ketone, polyphenylene sulfide, etc.; polysulfones such as polyether sulfone, etc.; polyimides such as polyether imides, polyamide imides, polybismaleimides, etc., polycarbonate; fluoro resins such as polyvinyl fluoride, polyvinylidene fluoride polytrifluoromonochloroethylene, etc.; various copolymers such as ethylene tetrafluoroethylene copolymers, hexafluoropropylene tetrafluoroethylene copolymers, and perfluoroalkoxytetrafluoroethylene copolymers; and thermoplastic urethane, polyvinyl chloride, polyvinylidene chloride, vinyl chloride/vinylidene chloride copolymers, crosslinked vinyl chloride resins, silicone resins, polyurethanes, and the like. These resins may be used alone or as a blend of two or more of the foregoing resins. Also employable are a blend of such a resin with another polyolefin and a blend of such a resin with an elastomer such as rubber.

Also useful are composite plastic materials comprising any of the foregoing resins and a reinforcement in the form of highly stiff inorganic fibers such as glass fibers, carbon fibers, boron fibers, silicon carbide and organic fibers such as Kevlar, an aromatic polyamide. Blends of any of the foregoing resins with carbon black, silica, calcium carbonate, clay, antioxidants or the like may also be used.

The connector insert can be manufactured from any suitable material which would withstand the parameters to which it is subjected. Furthermore, the material, when formed into the insert, should have sufficient strength and a robust characteristic to withstand the clamping forces used to assemble the plastic tubing to the hose. In addition to the robust requirement, the insert should prevent or provide adequate pull-off force.

The connector insert of the present invention should be of a size, i.e., length, body diameter and flared/tapered end diameter which requires effort to implant the insert into the tube wherein the tube expands due to the pressure exerted by forcing the insert into the inside surface of the tube and the end of the tube relaxes to form a bead on the end of the tube which prevents the insert from becoming free. The length and diameter of the insert is not critical and is determined by the tube into which the insert is to be set. The circumference of the rim of the flared/tapered end should be sufficient to allow the tube to form an adequate bead around the respective circumferential opening of the connector insert while reducing pull-off. Accordingly, the flared portion extends radially outward from the tubular member to a predetermined maximum circumference. Preferably, the height of the flared portion with respect to the outer diameter of the tube is about 0.010 to 0.070 inches. In the most preferred aspect of the invention, the connector insert is manufactured from a metal such as steel. However, it can be manufactured from a synthetic resin such as a thermoplastic material provided that the resin has sufficient strength to withstand the compression forces of the clamp.

In addition to the flared/tapered end of the tube connector insert, the body of the insert may include one or more annular ridges which would enhance the pull-off characteristics of the tube.

A clamping means such as screw clamp or a spring clamp may be included on the outer surface of the hose to prevent the tube from detaching from the hose.

Although the invention has been described with respect to preferred embodiments thereof, it is to be understood that the invention is not limited to those embodiments and that variations can be made therein without departing from the scope of the invention.

What is claimed is:

1. A connector insert for use in coupling a plastic tube to a hose, wherein said connector insert comprises a tubular member having a first end, a second end and a uniformly tubular body member along a longitudinal axis, said tubular body member being intermediate said first end and said second end, wherein said tubular body member further comprises a flared member extending radially outward in the direction of said first end to form an annular ridge, said flared member further tapering radially inward toward said first end forming a tapered surface terminating in a first annular rim adjacent said first end, said first annular rim having a smaller circumference than the circumference of said annular ridge and, wherein said tubular body member extends in a direction toward said second end to form a second annular rim adjacent said second end, the circumference of said tubular body member being essentially equal to the circumference of said second annular rim, the configuration of said insert being such that, upon being implanted into one end of a tube, said connector insert resides entirely within the tube, wherein the tube forms a bead around said first annular rim to secure said connector insert therein.

2. The connector insert of claim 1 wherein said flared member extends radially outward from said tubular member to a predetermined maximum circumference, said flared member further tapering radially inward from said predetermined maximum circumference to form said tapered surface terminating in said first annular rim having a circumference smaller than the circumference of said predetermined maximum circumference.

3. The connector insert of claim 1 wherein said flared member extends outwardly about 0.010 to 0.070 inches from said tubular member to form said first annular ridge.

4. The connector of claim 1 wherein said insert is manufactured from metal or a synthetic resin.

5. The connector of claim 4 wherein said insert is manufactured from metal.

6. The connector of claim 5 wherein said metal is steel.

7. The connector of claim 1 wherein said connector insert is configured to be permanently implanted in a plastic tube.

8. A connector insert in combination with a plastic tube for coupling said plastic tube to a hose, wherein said tube is a molded or extruded polymeric material selected from the group consisting of polyolefins, polyesters, polyamides, polyimides, polysulfones, polycarbonates, fluoro polymers, silicone polymers, polyurethanes, polyalkyleneterephthalates, and mixtures thereof, wherein said connector insert is configured to be implanted in said tube prior to said coupling, said connector insert comprising a tubular member having a first end, a second end and a uniformly tubular body member along a longitudinal axis, said tubular body member being intermediate said first end and said second end, wherein said tubular body member flares radially outward in the direction of said first end to form an annular ridge, said flared member further tapering radially inward toward said first end forming a tapered surface terminating in a first annular rim adjacent said first end, said first annular rim having a smaller circumference than the circumference of said annular ridge, and wherein said tubular body member extends in a direction toward said second end to form a second annular rim adjacent said second end, the circumference of said tubular body member being essentially equal to the circumference of said second annular rim, the configuration of said insert being such that, upon being implanted into one end of said tube, said tube forms a bead around said first annular rim to permanently secure said connector insert therein.

9. A tubular assembly comprising:
a hose having a uniform inner diameter extending a predetermined distance from at least one end of said hose;
a tube having an outer diameter equal to or less than said inner diameter of said hose, said outer diameter extending a predetermined distance from one end of said tube; and
a connector insert implanted into said one end of said tube for coupling said tube to said hose, said connector insert comprising a tubular member having a first end, a second end and a uniformly tubular body member along a longitudinal axis, said tubular body member being intermediate said first end and said second end, wherein said tubular body member flares radially outward in the direction of said first end forming an annular ridge, said tubular body member further tapering radially inward from said annular ridge toward said first end forming a tapered surface terminating in a first annular rim adjacent said first end, said first annular rim having a smaller circumference than the circumference of said annular ridge, and wherein said tubular body member extends in a direction toward said second end to form a second annular rim adjacent said second end, the circumference of said tubular body member being essentially equal to the circumference of said second annular rim, the configuration of said connector insert being such that, upon being implanted into one end of said tube, said tube forms a bead around said annular rim to secure said connector insert therein.

10. The assembly of claim 9 wherein said flared member extends radially outward from said tubular member to a predetermined maximum circumference, said annular ridge further tapering radially inward from said predetermined maximum circumference forming said tapered surface terminating in said first annular rim having a circumference less that the circumference of said maximum circumference.

11. The assembly of claim 9 wherein said flared member extends outwardly about 0.010 to 0.070 inches from said tubular member to form said first annular ridge.

12. The assembly of claim 9 wherein said insert is manufactured from a metal or synthetic resin.

13. The assembly of claim 9 wherein said insert is manufactured from metal.

14. The assembly of claim 13 wherein said metal is steel.

15. The assembly of claim 9 wherein said connector insert is permanently implanted in said tube.

16. The assembly of claim 9 further including clamping means on the outer surface of said hose wherein, upon activating said clamping means, said tube is prevented from detaching from said hose.

17. The assembly of claim 16 wherein said clamping means is a screw clamp or a spring clamp.

18. The assembly of claim 9 wherein said hose is constructed of a polymeric material selected from the group consisting of natural rubbers, synthetic rubbers, halogenated polymers, copolymers of olefins with diene rubber, copolymers of olefins with non-conjugated dienes, and blends thereof.

19. The assembly of claim 9 wherein said tube is a molded or extruded polymeric material selected from the group consisting of polyolefins, polyesters, polyamides, polyimides, polysulfones, polycarbonates, fluoro polymers, silicone polymers, polyurethanes, polyalkyleneterephthalates, and mixtures thereof.

20. The assembly of claim 9 further includes a reinforcement material selected from the group consisting of glass fibers, carbon fibers, boron fibers, silicon carbide and organic fibers.

21. The assembly of claim 9 further including carbon black, silica, calcium carbonate, clay, and antioxidants.

22. A tube assembly comprising:
a hose having a uniform inner diameter extending a predetermined distance from at least one end of said hose, wherein said hose is constructed of a polymeric material selected from the group consisting of natural rubbers, synthetic rubbers, halogenated polymers, copolymers of diene rubber with vinyl compounds, copolymers of diene rubber with olefins, and blends thereof;
a tube having an outer diameter equal to or less than said inner diameter of said hose, said outer diameter extending a predetermined distance from one end of said tube, wherein said tube is a molded or extruded polymeric material selected from the group consisting of polyolefins, polyesters, polyamides, polyimides, polysulfones, polycarbonates, fluoro polymers, silicone polymers, polyurethanes, polyalkyleneterephthalates, and mixtures thereof; and
a connector insert implanted into said one end of said tube for coupling said tube to said hose; said connector insert comprising a tubular member having a first end, a second end and a uniformly tubular body member along a longitudinal axis, said tubular body member being intermediate said first end and said second end, wherein said tubular body member flares radially outward from said longitudinal axis in the direction of said first end to form an annular ridge, said tubular body member further tapering radially inward from said annular ridge forming a tapered surface terminating in a first annular rim adjacent said first end, said first annular rim having a smaller circumference than said annular ridge, and wherein said tubular body member extends in a direction toward said second end to form a second annular rim adjacent said second end, the circumference of said tubular body member being essentially equal to the circumference of said second annular rim, the configuration of said insert being such that, upon being implanted into one end of said tube, said tube forms a bead around said first annular rim to permanently secure said connector insert therein.

* * * * *